United States Patent Office 2,980,693
Patented Apr. 18, 1961

2,980,693

ESTERS OF SUBSTITUTED BENZILIC ACIDS AND METHODS FOR PRODUCING SAME

John Frederick Cavalla, Isleworth, England, assignor to Parke, Davis & Company, Detroit, Mich., a corporation of Michigan No Drawing. Filed May 22, 1959, Ser. No. 814,977

Claims priority, application Great Britain May 28, 1958

5 Claims. (Cl. 260—326.3)

This invention relates to new derivatives of benzilic acid and to processes for their production. More particularly, it relates to benzilic acid esters which can be represented by the structural formula,

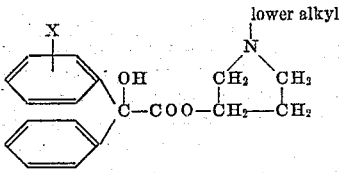

where X represents a halogen atom or a lower alkyl radical, to acid-addition salts thereof, and to methods for the production of such compounds.

In the foregoing formula the lower alkyl radical attached to the pyrrolidine ring is preferably an alkyl radical having fewer than 4 carbons atoms such as the methyl, ethyl, propyl or isopropyl radical.

In one of the methods for the manufacture of compounds of this invention, an alkyl ester of a mono-substituted benzilic acid of the formula,

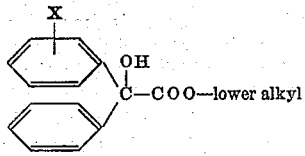

where X is defined as before, is reacted with a 1-alkyl-3-pyrrolidinol whereby the desired compound is formed by ester interchange. The reaction is preferably carried out under anhydrous conditions in the presence of an alkaline catalyst such as metallic sodium in an unreactive solvent such as benzene or toluene. Using benzene as a solvent, the reaction proceeds readily at the boiling point and is facilitated by continuous removal of the alcohol which is formed as a by-product.

Alkyl esters of mono-substituted benzilic acids used as starting materials in this process can be made by esterifying the corresponding acid by such means as refluxing it in a lower alkanol in the presence of an acid catalyst such as hydrogen chloride or concentrated sulfuric acid. The desired alkyl ester is then obtained by removing the solvent, partitioning the crude product between an organic solvent such as ether or benzene and dilute aqueous carbonate or bicarbonate, removing the solvent from the organic phase and distilling the residue in a vacuum. The mono-substituted benzilic acids can be obtained by the benzilic rearrangement of mono-substituted benzils with strong alkali. The alkyl esters of mono-substituted benzilic acids can also be obtained by the addition of a mono-substituted phenylmagnesium halide to an alkyl phenylglyoxylate followed by hydrolysis of the product.

In another method for the manufacture of compounds of this invention, a mono-substituted benzilic acid is converted to a diarylhaloacetyl halide which is then subjected to esterification with a 1-alkyl-3-pyrrolidinol followed by mild hydrolysis to obtain the desired product. For example, a diarylchloroacetyl chloride obtained by treatment of the free acid with thionyl chloride is esterified with a 1-alkyl-3-pyrrolidinol under anhydrous conditions in an unreactive solvent such as methylene chloride and the desired benzilic acid ester is obtained by subsequent treatment of the reaction product with water.

In a further method for the manufacture of compounds of this invention, a secondary amine of the formula,

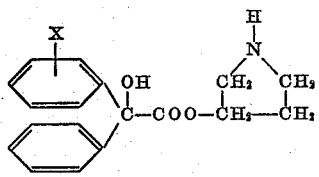

is subjected to alkylation with an alkylating agent such as an alkyl halide, sulfate or sulfonate whereby the selected alkyl group is introduced as a substituent on the nitrogen atom of the pyrrolidine ring. The alkylation can be carried out in any of a variety of organic solvents such as methanol, ethanol, isopropyl alcohol, acetone or butanone; and with reagents such as lower alkyl bromides and lower alkyl iodides it proceeds readily at temperatures substantially below 100° C. In order to obtain high yields of the desired tertiary amine, it is preferred to use approximately 1 molecular equivalent of the alkylating agent. Secondary amines useful as starting materials for the alkylation reaction can be produced in a variety of ways. For example, the sequence of reactions which comprises treating an alkyl ester of a monoalkyl benzilic acid with 1-benzyl-3-pyrrolidinol and subjecting the resultant product to catalytic hydrogenation for removal of the benzyl radical provides a 3-pyrrolidinol alkylbenzilate suitable for alkylation.

The free bases of this invention form non-toxic, water-soluble, acid-addition salts with a number of inorganic and strong organic acids. Among such acids are hydrochloric, hydrobromic, hydriodic, sulfuric, acetic, benzoic, citric, maleic, malic, gluconic, ascorbic and related acids. Such acid-addition salts, prepared by reaction of the free base and the acid, are equivalent to the free bases for purposes of this invention.

It is known that various benzilic acid esters possess anticholinergic and atropine-like activities. It has also been shown in Belgian Patent 555,178 that 1-alkyl-3-pyrrolidinol benzilates (unsubstituted on the aromatic rings) have useful pharmacological properties because of their effects upon the central nervous system. The compounds of this invention are also valuable as central nervous system drugs and in addition exhibit little of the peripheral atropine-like effect which characterizes compounds having related structures. The compounds of this invention are central parasympathetic suppressants and are useful as ataractic agents.

The invention is illustrated, but not limited, by the following examples:

*Example 1*

1-hydrocarbon substituted-3-pyrrolidinols, useful as starting materials in the practice of this invention, can be prepared by the reaction of 1,4-dichlorobutan-3-ol with amines. For example, 429 g. of 1,4-dichlorobutan-3-ol is mixed with an excess of anhydrous ethylamine at —30° C., and the mixture is heated in an autoclave at 105–110° C. for five hours. A cooled solution of the product in 200 ml. of water is treated with a solution of 395 g. of potassium hydroxide in 395 ml. of water. This mixture is again chilled and filtered to remove a precipitate of potassium chloride which is washed separately with benzene. The aqueous filtrate is then treated with solid potassium hydroxide until an oily layer separates; this is removed and treated with more potassium hydroxide until no more water can be separated. The combined aqueous layers are then extracted with the benzene washings previously obtained and the benzene extract is added to the oil. The oil is then fractionally distilled in a vacuum to give the desired 1-ethyl-3-pyrrolidinol as a distillate boiling at about 94–100° C. at 20 mm. pressure; $n_D^{20}=1.4662$.

By the substitution of propylamine for the ethylamine, the compound obtained is 1-propyl-3-pyrrolidinol boiling at about 108° C. at 20 mm.; $n_D^{20}=1.4639$.

By the substitution of isopropylamine for the ethylamine, the compound obtained is 1-isopropyl-3-pyrrolidinol boiling at about 98° C. at 13 mm.; $n_D^{20}=1.4665$.

By the substitution of benzylamine for the ethylamine, the compound obtained is 1-benzyl-3-pyrrolidinol boiling at about 119–120° C. at 0.7 mm.; $n_D^{20}=1.5479$.

1-methyl-3-pyrrolidinol can be obtained by the substitution of methylamine for the ethylamine in the foregoing procedure or alternatively by the method described in Berichte, 61, 263–268 (1928).

*Example 2*

A solution of 32.5 g. of ethyl p-methylbenzilate and 13.85 g. of 1-ethyl-3-pyrrolidinol in 250 ml. of benzene is rendered anhydrous by distillation of a small quantity of benzene. Sodium (200 mg.) is then added and heating is continued under partial reflux so that the benzene-alcohol azeotrope which forms is gradually removed by distillation over a period of five hours. The solution is cooled, neutralized with 1 ml. of acetic acid and washed four times with 60 ml. portions of water. The benzene is removed by vaporization and the residue is distilled in a vacuum to give 1-ethyl-3-pyrrolidinol p-methylbenzilate as a fraction boiling at about 186–196° C. at 0.9 mm.; $n_D^{20}=1.5613$.

A solution of this free base in dry ether is treated with a slight excess of hydrogen chloride in dry ether and the resulting precipitate is filtered in a dry atmosphere and recrystallized from a mixture of absolute ethanol and dry ether to give 1 - ethyl - 3 - pyrrolidinol p-methylbenzilate hydrochloride, M.P. about 155–158° C.

*Example 3*

A solution of 100 g. of o-methylbenzilic acid [Shacklett and Smith, J. Amer. Chem. Soc. 75, 2654 (1953)] in 1500 ml. of ethanol containing 100 g. of hydrogen chloride is heated under reflux for 8 hours. The alcohol is removed by distillation and a solution of the residue in ether is washed several times with dilute sodium bicarbonate solution and dried over anhydrous magnesium sulfate. The ethereal solution is brought to dryness by evaporation and the residue is distilled in a vacuum to give ethyl o-methylbenzilate as a fraction boiling at about 149–150° C. at 0.9 mm.; $n_D^{20}=1.5584$.

A solution of 27 g. of ethyl o-methylbenzilate and 11.5 g. of 1-ethyl-3-pyrrolidinol in 250 ml. of benzene is rendered anhydrous by distillation until about 25 ml. of benzene has been collected as a distillate. Sodium (200 mg.) is added and heating under partial reflux is continued so that the alcohol formed in the reaction is slowly removed by distillation as the benzene-alcohol azeotrope over a period of five hours. The cooled reaction mixture is neutralized with about 1 ml. of acetic acid, washed four times with 60 ml. portions of water and brought to dryness by vaporization of the benzene. Distillation of the residue in a vacuum affords 1-ethyl-3-pyrrolidinol o-methylbenzilate as a fraction boiling at about 184–187° C. at 0.9 mm.; $n_D^{20}=1.5632$.

The hydrochloride, prepared by treating an ethereal solution of the free base with hydrogen chloride and recrystallizing the precipitated product from a mixture of ethanol and ether, melts at about 165–168° C.

*Example 4* m-methylbenzilic acid [Shacklett and Smith, J. Amer. Chem. Soc. 75, 2654 (1953)] is esterfied with ethanol and hydrogen chloride according to the procedure of Example 3. The product obtained is ethyl m-methylbenzilate, B.P. 152–158° C. at 0.9 mm.; $n_D^{20}=1.5546$.

A solution of 27 g. of ethyl m-methylbenzilate and 11.5 g. of 1-ethyl-3-pyrrolidinol in 250 ml. of benzene is rendered anhydrous by carrying out a distillation until about 25 ml. of benzene is collected as a distillate. Sodium (200 mg.) is added and the reaction mixture is heated under partial reflux for five hours so that the benzene-alcohol azeotrope is gradually removed by distillation. The cooled benzene solution is neutralized with acetic acid, washed with several portions of water and brought to dryness by vaporization of the ether. Upon distillation of the residue in a vacuum, there is obtained 1-ethyl-3-pyrrolidinol m-methylbenzilate, B.P. 170–180° C. at 0.25 mm.; $n_D^{20}=1.5599$. 1-ethyl-3-pyrrolidinol m-methylbenzilate hydrochloride, M.P. about 143–145° C., is prepared by treating an ethereal solution of the free base with hydrogen chloride and recrystallizing the precipitated product from a mixture of ethanol and ether.

*Example 5*

An ethereal solution of p-bromophenylmagnesium bromide, prepared by reacting 5.4 g. of magnesium with 52 g. of p-dibromobenzene in 200 ml. of anhydrous ether, is slowly added over a period of two hours to a stirred solution of 40 g. of ethyl phenylglyoxylate in 150 ml. of anhydrous ether. The resulting mixture is stirred for one hour at room temperature, chilled and then stirred with 250 ml. of 2-normal hydrochloric acid. The separated aqueous phase is washed twice with 150 ml. portions of ether. All ethereal solutions are combined and dried over anhydrous sodium sulfate. The ether is removed by evaporation and the residue is distilled in a vacuum to give ethyl p-bromobenzilate as a fraction boiling at about 153° C. at 0.3 mm.; $n_D^{20}=1.5761$.

A solution of 33.5 g. of ethyl p-bromobenzilate and 11.5 g. of 1-ethyl-3-pyrrolidinol in 250 ml. of benzene is rendered anhydrous by removal of the benzene-water azeotrope. Sodium (200 mg.) is then added and heating under partial reflux is continued for five hours. During this time, the alcohol which forms in the reaction is removed by distillation as the benzene-alcohol azeotrope. The cooled benzene solution is then neutralized with acetic acid, washed with several portions of water and brought to dryness by vaporization of the benzene. The residue which is crude 1-ethyl-3-pyrrolidinol p-bromobenzilate is dissolved in ether and treated with a slight excess of hydrogen chloride. The precipitate is removed by filtration and recrystallized from a mixture of ethanol and ether. This compound is 1-ethyl-3-pyrrolidinol p-bromobenzilate hydrochloride, M.P. 205–207° C.

*Example 6*

A solution of p-chlorophenylmagnesium bromide, prepared by reacting 5.4 g. of magnesium with 42 g. of p-bromochlorobenzene in 200 ml. of anhydrous ether is gradually added to a stirred solution of 40 g. of ethyl phenylglyoxylate in 150 ml. of dry ether over a period of 2 hours. The reaction mixture is stirred for 1 hour at room temperature, chilled and then treated with 250 ml. of 2-normal hydrochloric acid. The ethereal phase is combined with ether washings of the aqueous phase, dried over anhydrous sodium sulfate and evaporated. By fractional distillation of the residue in a vacuum there is obtained ethyl p-chlorobenzilate as a distillate boiling at about 153° C. at 0.95 mm.; $n_D^{20}=1.5640$.

A solution of 28.2 g. of ethyl p-chlorobenzilate and 11.5 g. of 1-ethyl-3-pyrrolidinol in 250 ml. of benzene is rendered anhydrous by removing a small amount of benzene-water azeotrope as a distillate, treated with 200 mg. of sodium and heated under partial reflux for five hours so that the alcohol formed in the reaction is gradually removed as a benzene-alcohol azeotrope. The cooled benzene solution is neutralized with acetic acid, washed with several portions of water and brought to dryness by vaporization of the benzene. The residue is distilled in a vacuum to afford 1-ethyl-3-pyrrolidinol p-chlorobenzilate, B.P. 184–190° C. at 0.5 mm.; $n_D^{20}=1.5694$.

The hydrochloride, prepared by treating an ethereal solution of the free base with hydrogen chloride and recrystallizing the precipitated product from a mixture of alcohol and ether, melts at about 180–183° C.

The water-soluble hydrobromide is prepared by treating an ethereal solution of the free base with a slight excess of hydrogen bromide in isopropyl alcohol and collecting the precipitated product.

A water-soluble citrate is prepared by mixing solutions of the free base and citric acid in methanol followed by concentrating the mixture or diluting it with ether.

Example 7

An ethereal solution of m-chlorophenylmagnesium bromide, prepared by reacting 5.4 g. of magnesium with 42 g. of m-bromochlorobenzene in 200 ml. of dry ether is added over a two-hour period to a stirred solution of 40 g. of ethyl phenylglyoxylate in 150 ml. of dry ether. Stirring is continued for one more hour at room temperature. The cooled ethereal solution is stirred with 250 ml. of 2-normal hydrochloric acid, combined with ether washings of the separated aqueous layer and dried over anhydrous sodium sulfate. By vaporization of the ether and distillation of the residue in a vacuum, there is obtained ethyl m-chlorobenzilate, B.P. about 144° C. at 0.25 mm.; $n_D^{20}=1.5690$.

An anhydrous solution of 28.2 g. of ethyl m-chlorobenzilate and 11.5 g. of 1-ethyl-3-pyrrolidinol in 250 ml. of benzene is treated with 200 mg. of sodium and heated under partial reflux for five hours so that the alcohol which forms in the reaction is removed by distillation. The remaining benzene solution is cooled, neutralized with acetic acid and washed with several portions of water. The benzene is removed by distillation and the residue dissolved in ether is treated with a slight excess of hydrogen chloride. The precipitated 1-ethyl-3-pyrrolidinol m-chlorobenzilate hydrochloride is collected on a filter and recrystallized from a mixture of ethanol and ether. This compound melts at about 164–165° C.

By the same procedure, with the substitution of 10.1 g. of 1-methyl-3-pyrrolidinol for the 1-ethyl-3-pyrrolidinol followed by conversion of the free base to the hydrochloride, the compound obtained is 1-methyl-3-pyrrolidinol m-chlorobenzilate hydrochloride.

Example 8

A solution of o-chlorophenylmagnesium bromide, prepared by reacting 5.4 g. of magnesium with 42 g. of o-bromochlorobenzene in 200 ml. of anhydrous ether, is added over a two-hour period to a stirred solution of 40 g. of ethyl phenylglyoxylate in 150 ml. of ether. Stirring is continued for one more hour at room temperature and then the cooled ethereal solution is mixed with 250 ml. of 2-normal hydrochloric acid. The ethereal phase is combined with ether washings of the separated aqueous phase, dried and evaporated. The residue is distilled in a vacuum to afford ethyl o-chlorobenzilate, B.P. about 154–156° C. at 0.6 mm.; $n_D^{20}=1.5735$.

An anhydrous solution of 28.2 g. of ethyl o-chlorobenzilate and 11.5 g. of 1-ethyl-3-pyrrolidinol in 250 ml. of benzene is treated with 200 mg. of sodium and heated under partial reflux for five hours so that the alcohol which forms in the reaction is continuously removed. The cooled reaction mixture is neutralized with acetic acid, washed with several portions of water and brought to dryness by vaporization of the benzene. When a solution of the residue in ether is treated with hydrogen chloride and the precipitated product is collected and recrystallized from a mixture of ethanol and ether, the compound obtained is 1-ethyl-3-pyrrolidinol o-chlorobenzilate hydrochloride, M.P. about 199–200° C.

By the foregoing procedure, with the substitution of 12.9 g. of 1-propyl-3-pyrrolidinol for the 1-ethyl-3-pyrrolidinol and subsequent treatment of the crude free base with hydrogen chloride, the compound obtained is 1-propyl-3-pyrrolidinol o-chlorobenzilate hydrochloride.

By the foregoing procedure, with the substitution of 12.9 g. of 1-isopropyl-3-pyrrolidinol for the 1-ethyl-3-pyrrolidinol and subsequent treatment of the free base with hydrogen chloride, the compound obtained is 1-isopropyl-3-pyrrolidinol o-chlorobenzilate hydrochloride.

Example 9

A mixture of 10 g. of p-chlorobenzilic acid and 100 ml. of thionyl chloride is allowed to stand at room temperature for three hours and is then distilled to dryness under reduced pressure. Petroleum ether (20 ml.) is added to the residue and the mixture is again brought to dryness by distillation under reduced pressure. The latter operation is repeated several times in order to remove almost all of the remaining traces of thionyl chloride. The residue is α-chloro-α-phenyl-α-p-chlorophenylacetyl chloride suitable for use without further purification.

A solution of 4 g. of 1-ethyl-3-pyrrolidinol in 25 ml. of dry methylene chloride is gradually added to a refluxing solution of 10.4 g. of α-chloro-α-phenyl-α-p-chlorophenylacetyl chloride in 30 ml. of dry methylene chloride. The reaction mixture is heated under reflux for one more hour and then distilled to dryness. The residue is heated for five minutes at 90–100° C. with 200 ml. of water, following which the aqueous mixture is allowed to stand at room temperature for two days. It is then made distinctly basic by the addition of potassium carbonate and extracted with several portions of benzene. The combined benzene extract is distilled to dryness. A solution of the residue in ether is treated with a slight excess of hydrogen chloride and the precipitated product is recrystallized from a mixture of ethanol and ether. This compound is 1-ethyl-3-pyrrolidinol p-chlorobenzilate hydrochloride which melts at about 180–183° C. and is identical with the product of Example 6.

Example 10

An anhydrous solution of 27 g. of ethyl p-methylbenzilate and 17.7 g. of 1-benzyl-3-pyrrolidinol in 300 ml. of benzene is treated with 200 mg. of sodium and heated under partial reflux for five hours with continuous removal of the alcohol which is formed in the reaction.

The cooled mixture is neutralized with acetic acid, washed with several portions of water and evaporated to dryness. Small quantities of unreacted 1-benzyl-3-pyrrolidinol and ethyl p-methylbenzilate are removed by heating at about 165° C. at 1 mm. The residue is crude 1-benzyl-3-pyrrolidinol p-methylbenzilate which is suitable for catalytic hydrogenation according to the following procedure without further purification. The entire crude product is dissolved in 350 ml. of ethanol and 3 g. of 5% palladium on charcoal catalyst is added. This mixture is shaken in the presence of a hydrogen atmosphere for four hours at 60° C. or until the calculated amount of hydrogen has been absorbed. The catalyst is then removed by filtration and the filtrate is brought to dryness by distillation under reduced pressure. The residual product is 3-pyrrolidinol p-methylbenzilate which is subjected directly to alkylation. A solution of 5 g. of this crude product and 1.6 g. of ethyl iodide in 100 ml. of alcohol containing a catalytic amount of pyridine is heated in a sealed reaction vessel for one hour at 60° C. The solution is then brought to dryness by distillation of the solvent and a solution of the residue in ether is treated with a slight excess of hydrogen chloride. The precipitated product is collected and recrystallized from a mixture of ethanol and ether to give 1-ethyl-3-pyrrolidinol p-methylbenzilate hydrochloride which melts at about 155–158° C. and is identical with the product of Example 2.

I claim:
1. A member of the class consisting of compounds of the formula

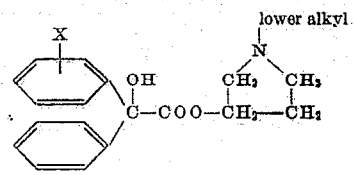

and non-toxic acid-addition salts thereof, where X is selected from the class consisting of halogen atoms and lower alkyl radicals.

2. A compound of the formula

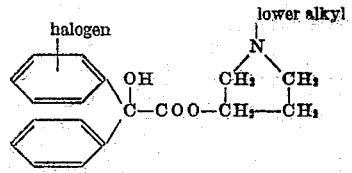

3. 1-ethyl-3-pyrrolidinol p-chlorobenzilate.
4. A compound of the formula

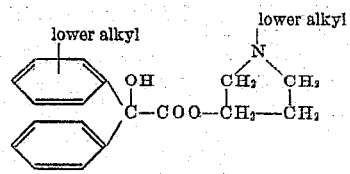

5. 1-ethyl-3-pyrrolidinol p-methylbenzilate.

References Cited in the file of this patent

FOREIGN PATENTS

| | | |
|---|---|---|
| 555,178 | Belgium | Aug. 20, 1957 |
| 582,535 | Great Britain | Nov. 20, 1946 |

OTHER REFERENCES

Smith et al.: J. Org. Chem., vol. 21, pp. 1423–1425 (1956).